US006969846B2

(12) United States Patent
Tanaka et al.

(10) Patent No.: US 6,969,846 B2
(45) Date of Patent: Nov. 29, 2005

(54) LIGHT SOURCE UNIT AND SCANNING OPTICAL APPARATUS USING THE SAME

(75) Inventors: Yoshihiko Tanaka, Shizuoka (JP); Nobuo Nakajima, Chiba (JP); Yasutaka Naruge, Shizuoka (JP); Koji Furusawa, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 303 days.

(21) Appl. No.: 10/373,012

(22) Filed: Feb. 26, 2003

(65) Prior Publication Data
US 2003/0173508 A1  Sep. 18, 2003

(30) Foreign Application Priority Data

Feb. 28, 2002  (JP) ............................ 2002-054722
Apr. 18, 2002  (JP) ............................ 2002-116149

(51) Int. Cl.[7] ............................................... H01J 5/02
(52) U.S. Cl. ..................................... 250/239; 250/235
(58) Field of Search .............................. 250/239, 216, 250/234, 235, 236; 358/489, 490; 359/212, 359/213, 216

(56) References Cited

U.S. PATENT DOCUMENTS

| 5,671,077 A |   | 9/1997  | Imakawa et al. ........... 359/204 |
| 5,886,805 A |   | 3/1999  | Park .......................... 359/196 |
| 6,163,333 A | * | 12/2000 | Kamioka .................... 347/241 |
| 6,664,952 B2 | * | 12/2003 | Iwamoto et al. ............ 345/175 |

FOREIGN PATENT DOCUMENTS

| CN | 1184292      | 6/1998 |
| JP | 9-230259     | 9/1997 |
| JP | 2000-56245   | 2/2000 |
| JP | 2000-131634  | 5/2000 |
| JP | 2002-189180  | 7/2002 |

* cited by examiner

Primary Examiner—Que T. Le
(74) Attorney, Agent, or Firm—Fitzpatrick, Cella, Harper & Scinto

(57) ABSTRACT

The present invention has as its object to provide a light source unit in which the relative portion of a detecting device and a condensing device is accurately determined, whereby the detecting device can reliably detect a laser beam, and a scanning optical apparatus using the same, and for this purpose, the present invention provides a scanning optical apparatus having a light source, a holding member for holding the light source, a deflecting device for deflecting light emitted from the light source, a detecting device for detecting the light deflected by the deflecting device, and a condensing lens for condensing the light incident on the detecting device, wherein the holding member positions the detecting device, and holds the condensing lens.

6 Claims, 8 Drawing Sheets

TAPER PORTION

ASSEMBLY DIRECTION

MAIN SCANNING DIRECTION

LIGHT SOURCE UNIT AND SCANNING OPTICAL APPARATUS USING THE SAME

BACKGROUND OF THE INVENTION

1. Field of the Invention

This invention relates to a scanning optical apparatus for use in an image forming apparatus such as a laser beam printer or a laser facsimile apparatus, and particularly to a light source unit integrally holding a light source and light detecting means.

2. Description of Related Art

FIG. 1 of the accompanying drawings shows a scanning optical apparatus (see, for example, Japanese Patent Application Laid-Open No. 2000-131634) used in a conventional image forming apparatus. A laser beam emitted from a semiconductor laser 101 is converted into a parallel beam or a convergent beam by a collimator lens 102, and is imaged in a linear shape on a rotary polygon mirror 104 by a cylindrical lens 103. This laser beam is then deflected by the rotary polygon mirror 104, and is imaged and scanned on a photosensitive drum 106 by an Fθ lens 105. Also, part of the deflected laser beam is incident on a light receiving element 108 through a synchronization detecting lens 107 by the utilization of a portion outside an image area, and writing start position adjustment is effected on the basis of the signal of the light receiving element 108. The light receiving element 108 is carried on the same substrate as a circuit substrate 100 on which the semiconductor laser 101 is carried, whereby it is unnecessary to provide a discrete circuit substrate exclusively for the light receiving element 108. The provision of a discrete circuit substrate would lead to an increase in the number of parts and a plurality of substrates, which in turn would lead to the complication of an electric circuit substrate, and this would result in a factor of increased costs such as an increase in the work of running wiring and therefore, Japanese Patent Application Laid-Open No. 2000-131634 has been proposed as an improving means.

In recent years, the scanning optical apparatus of the above-described construction has come to be designed such that toward a still higher speed, the rotary polygon mirror 104 is rotated at a high speed. Accordingly, the time from after the first laser beam has been detected by the light receiving element 108 until the next laser beam is detected by the light receiving element 108 becomes shorter as the rotary polygon mirror 104 is rotated at a higher speed. In this case, the light receiving element 108 need be quick in response and for this purpose, the light receiving surface of the light receiving element 108 is required to be as small as possible.

Consequently, if the light receiving surface of the light receiving element 108 is large, the relative positional relationship between the light receiving element 108 and an optical element (such as, for example, the rotary polygon mirror 104 or the synchronization detecting lens 107) for directing the laser beam to the light receiving element 108 need not be so strict, but yet if the light receiving surface of the light receiving element 108 is small, there has been the possibility of the laser beam being incapable of being detected by the light receiving element 108 unless the relative position of the light receiving element 108 and the optical element is determined accurately.

Also, when as described in Japanese Patent Application Laid-Open No. 09-230259 or Japanese Patent Application Laid-Open No. 2002-189180, a multilaser beam provided with a plurality of light emitting points is used as a semiconductor laser, a laser holder must be rotated and adjusted for the adjustment between the pitches in the sub-scanning direction, and at that time, a BD sensor (light receiving element) is integral with the laser holder and therefore, when the laser holder is rotated about an optical axis, the BD sensor is also rotatively moved in the same direction, and it has been difficult to introduce scanning light from a light deflector into the BD sensor.

SUMMARY OF THE INVENTION

It is a first object of the present invention to provide such a light source unit that the relative position of detecting means and condensing means is determined accurately, whereby the detecting means can reliably detect a laser beam, and a scanning optical apparatus using the same.

It is a second object of the present invention to provide a scanning optical apparatus which has a light source, a holding member for holding the light source, deflecting means for deflecting light emitted from the light source, detecting means for detecting the light deflected by the deflecting means, and condensing means for condensing the light incident on the detecting means, and in which the holding member positions the detecting means, and holds the condensing means.

It is a third object of the present invention to provide a light source unit which has a light source, a holding member for holding the light source, detecting means for detecting light emitted from the light source and deflected by deflecting means, and condensing means for condensing the light incident on the detecting means, and in which the holding member positions the detecting means, and holds the condensing means.

Further objects of the present invention will become apparent from the following description.

DESCRIPTION OF THE PREFERRED EMBODIMENTS

Some preferred embodiments of this invention will hereinafter be described in detail by way of example with reference to the drawings. However, the dimensions, materials, shapes and relative arrangements of constituent parts described in these embodiments are to be suitably changed depending on an apparatus to which the invention is applied and various conditions, and the scope of this invention is not intended to be restricted to the following embodiments.

(Embodiment 1)

Figure 1:
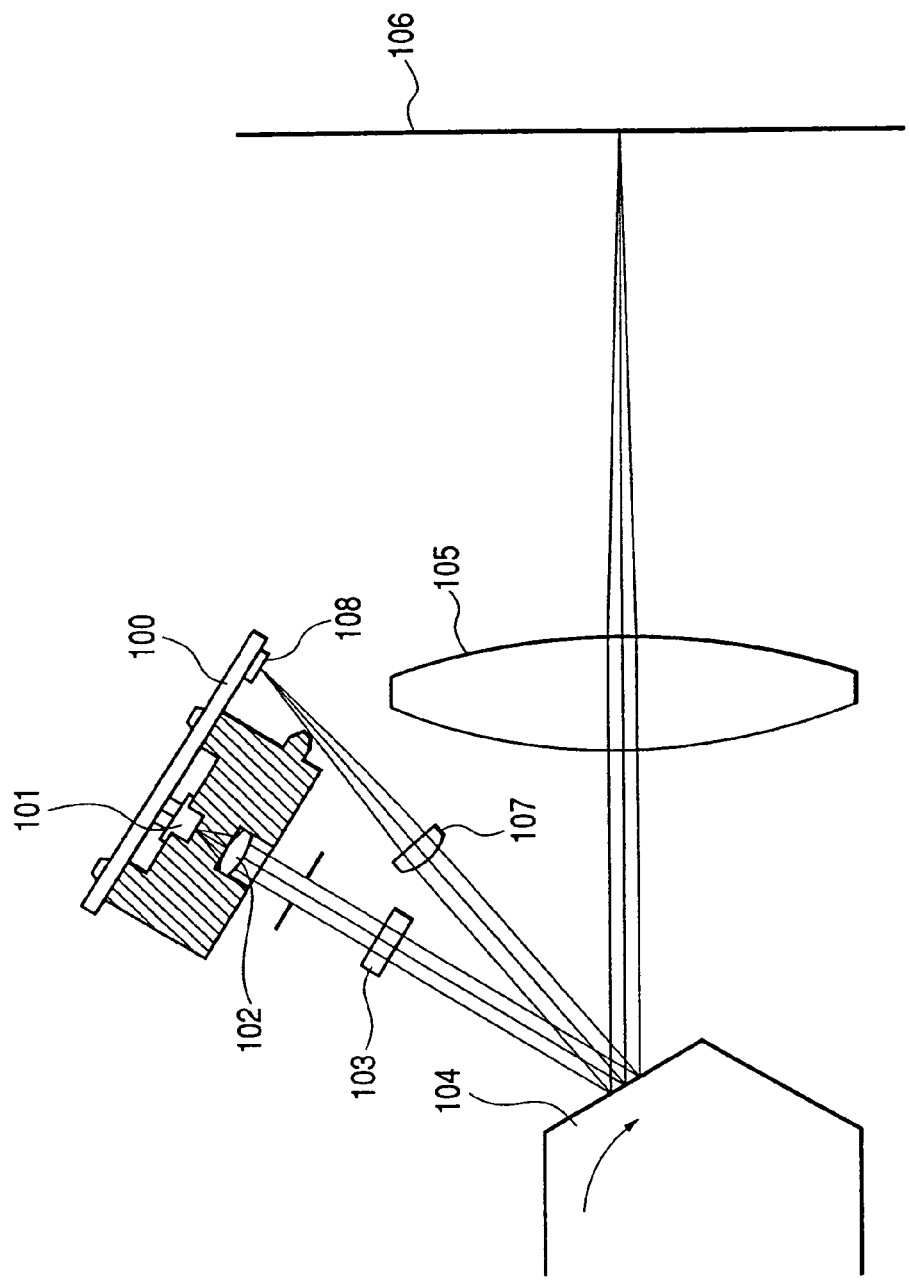
FIG. 1 shows the construction of a conventional scanning optical apparatus.
Figure 3:
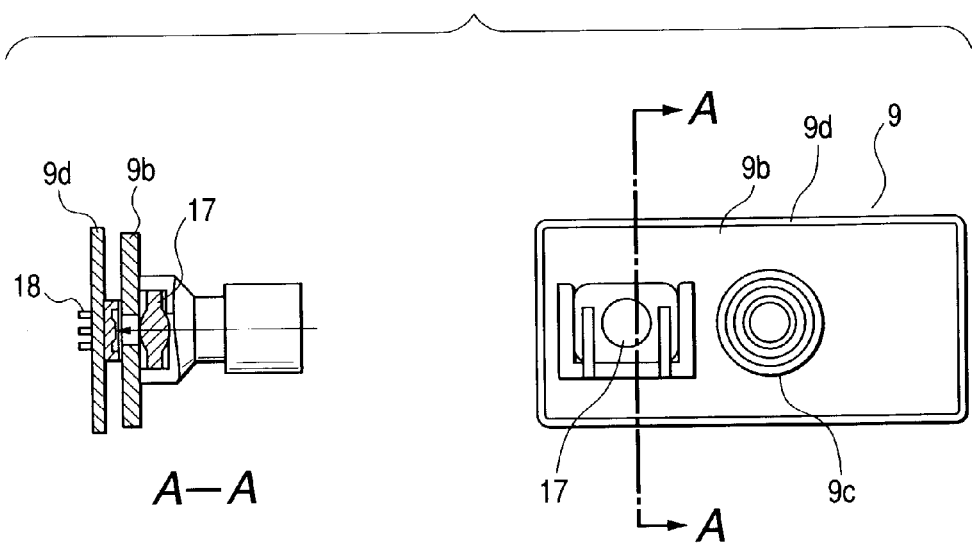
FIG. 3 shows an optical path to a synchronization detector when the multibeam light source unit of the scanning optical apparatus according to Embodiment 1 of the present invention is not rotated and adjusted.
Figure 4:
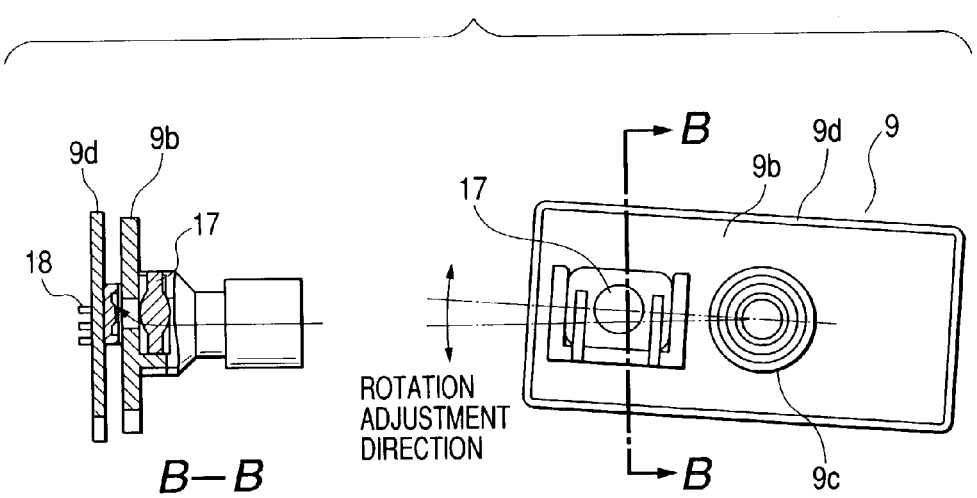
FIG. 4 shows the optical path to the synchronization detector when the multibeam light source unit of the scanning optical apparatus according to Embodiment 1 of the present invention is rotated and adjusted.
Figure 5:
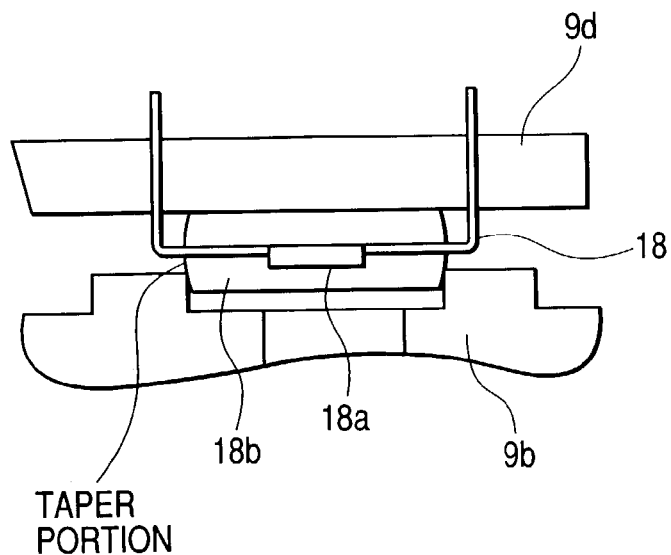
FIG. 5 is a main scanning cross-sectional view showing the positioning means of the synchronization detector of the scanning optical apparatus according to Embodiment 1 of the present invention.
Figure 6:
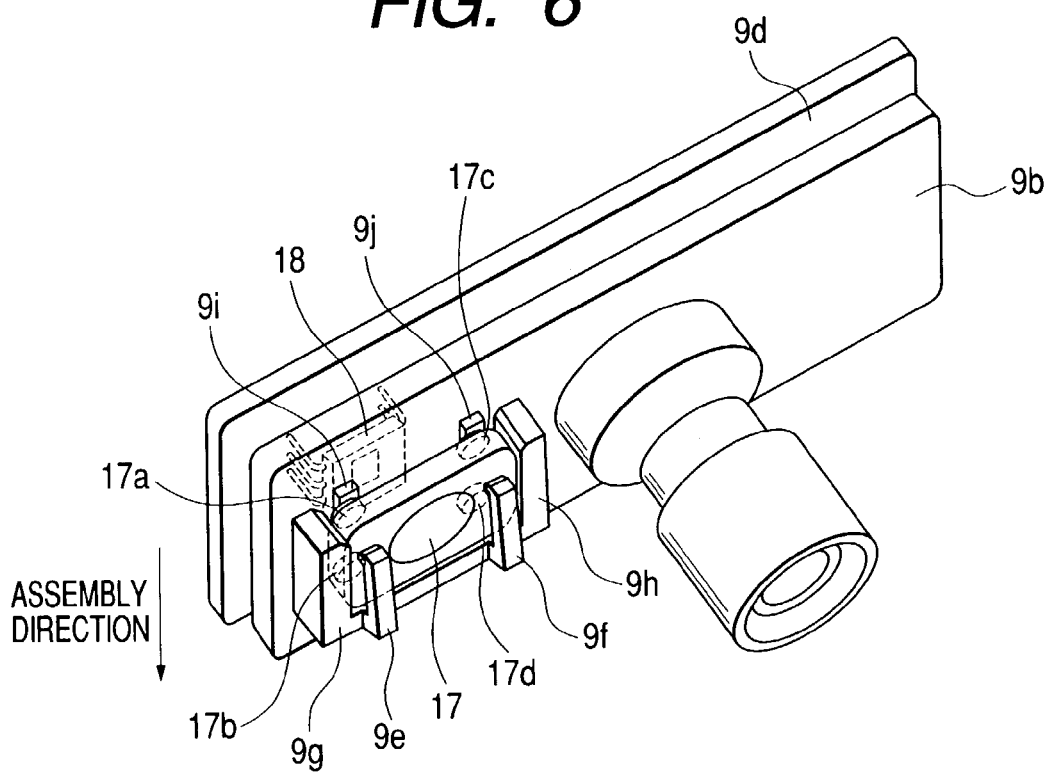
FIG. 6 is a perspective view of the multibeam light source unit of the scanning optical apparatus according to Embodiment 1 of the present invention.

Embodiment 1 of a scanning optical apparatus according to the present invention will hereinafter be described with reference to the drawings. FIG. 1 is a perspective view of the scanning optical apparatus, FIGS. 3 and 4 show an optical path to a synchronization detector when a multibeam light source unit is rotated and adjusted, FIG. 5 shows the positioning means of the synchronization detector, and FIG. 6 is a perspective view of the multibeam light source unit.

Figure 2:
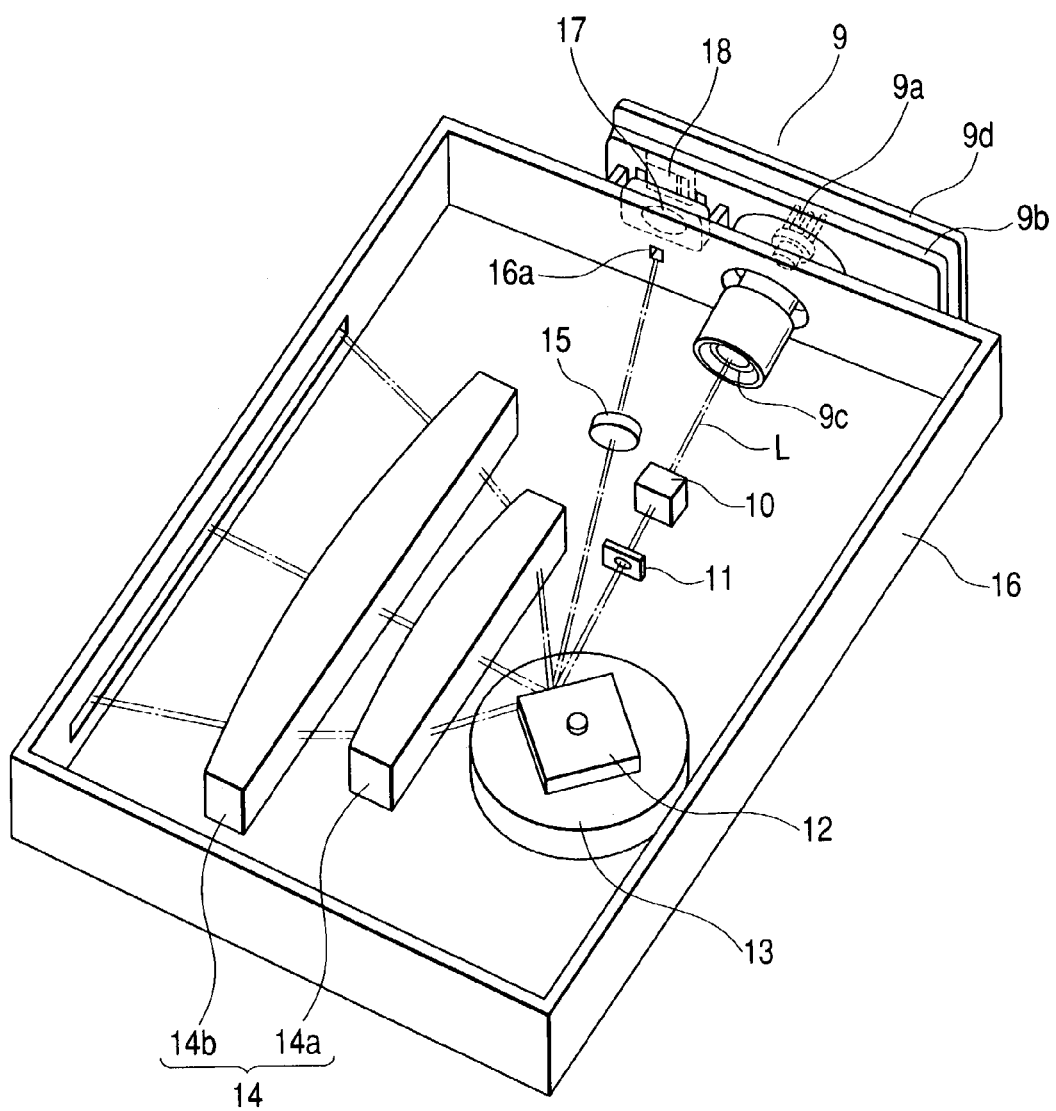
FIG. 2 is a perspective view of the whole of a scanning optical apparatus according to Embodiment 1 of the present invention.

The scanning optical apparatus according to the present embodiment will first be described with reference to the perspective view of FIG. 2 showing the scanning optical apparatus.

The scanning optical apparatus has a multibeam light source unit 9, a rotary polygon mirror 12 as deflecting means for deflecting and scanning a laser beam emitted from the multibeam light source unit 9, an Fθ lens 14 as an imaging optical system for condensing the laser beam deflected and scanned by the rotary polygon mirror 12 on a surface to be scanned, and a synchronization detecting optical lens 15 for directing the laser beam to a synchronization detector 18 which is detecting means provided on the multibeam light source unit 9, and the multibeam light source unit 9, the rotary polygon mirror 12, the Fθ lens 14 and the synchronization detecting optical lens 15 are contained in an optical box 16.

The multibeam light source unit 9 assumes a construction having a multibeam light source 9a having a plurality of light emitting points oscillating laser beams independently modulated in conformity with image information, a collimator lens 9c for making the laser beams emitted from the multibeam light source 9a into substantially parallel beams, a laser holder 9b as a holding member for holding the multibeam light source 9a and the collimator lens 9c, a circuit substrate 9d having the drive controlling portion of the multibeam light source 9a fixed to the laser holder 9b, and a synchronization detector 18 carried on the circuit substrate 9d. Also, the multibeam light source 9a is a semiconductor laser having a laser chip and a case for protecting the laser chip, and the semiconductor laser is held by being pressed into the laser holder 9b.

At least a portion of the synchronization detector 18 abuts against the laser holder 9b and is positioned thereby, and further, a condensing lens 17 which is condensing means for condensing the laser beams on the synchronization detector 18 is provided at a position on the incidence side of the laser beams which is opposed to the synchronization detector 18, and this condensing lens 17 is designed to abut against the laser holder 9b and be positioned and held thereby.

As described above, the laser holder integrally positions and holds the synchronization detector and the condensing lens and therefore, it becomes possible to accurately determine the relative positional relationship between the synchronization detector and the condensing lens.

As shown in FIG. 5, the synchronization detector 18 has a light receiving portion (photoelectric converting portion) 18a for detecting the laser beams, and a package portion 18b containing this photoelectric converting portion 18a therein to protect it and formed accurately, and is positioned and held by at least a portion of this package portion 18b abutting against the laser holder 9b.

A plurality of laser beams are emitted from the light emitting points of the multibeam light source 9a at a time, and the laser beams are made into parallel beams or convergent beams by the collimator lens 9c, and are converged only in the sub-scanning direction by a cylindrical lens 10, and pass through an aperture stop 11 and have their beam width limited thereby, and are imaged in the shape of a focal line extending long in the main scanning direction on the deflecting and reflecting surface of the rotary polygon mirror 12 as deflecting means.

The aperture stop 11 in the present embodiment is disposed near the rotary polygon mirror 12, whereby the incoincidence between the beams on the deflecting and reflecting surface of the rotary polygon mirror 12 is reduced so that there may not be a difference between the degrees of occurrence of aberrations between scanning lines to the utmost. The beams reflected and deflected and scanned by the rotary polygon mirror 12 are condensed into a spot shape on a photosensitive drum by the Fθ lens 14 and are scanned at a constant speed.

The plurality of laser beams emitted from the multibeam light source unit 9 pass through the synchronization detecting optical system 15 before they are reflected by the rotary polygon mirror 12 and enter an image area, and pass through a synchronization detection regulating portion 16a in the main scanning direction and are directed to the single synchronization detector 18 by the condensing lens 17. Synchronization detection is effected independently with respect to each beam, and a predetermined delay time after the detection signal thereof is used as a writing start position in the main scanning direction.

By such a construction, even in the case of a multibeam optical system in which a plurality of laser beams are emitted, the plurality of laser beams are reliably directed to a single synchronization detector by a condensing lens and therefore, it is not necessary to take the trouble to provide a discrete synchronization detector.

In the case of the multibeam light source 9a, it is necessary to adjust the interval between scanning lines in the sub-scanning direction to a predetermined interval and therefore, the multibeam light source unit 9 is rotation-adjusted about an optical axis L, and thereafter is assembled to the optical box 16 containing the parts of the scanning optical apparatus therein as by screws, not shown. At this time, the synchronization detector 18 is carried on the circuit substrate 9d for causing the multibeam light source 9a to emit light, and is integral with the multibeam light source unit 9 and is therefore assembled to the optical box 16 at a position in which it has been rotated about the optical axis L.

Assuming that in this state, the condensing lens 17 is absent, the laser beams passed through the synchronization detection regulating portion 16a in the main scanning direction may not enter the synchronization detector 18 in some cases, and it will become impossible to obtain a synchronizing signal (writing start signal).

The synchronization detector 18, when it detects the signals of a plurality of laser beams, is required to have a high-speed respondent property. Therefore, it is preferable that the area of the light receiving surface of the synchronization detector be as small as possible. For example, assuming the size of the light receiving surface of the synchronization detector is φ1 mm and the distance from the optical axis L to the light receiving surface of the sensor is 20 mm, when the multibeam light source unit 1 is rotated by about 1.5° about the optical axis L, the light receiving surface of the synchronization detector is moved by about 0.52 mm (20×tan 1.5°) in the sub-scanning direction, and the laser beams do not enter the light receiving surface of the synchronization detector and the writing start signal becomes incapable of being detected.

The rotation adjustment angle may not be disposed at a design angle due to the working error or assembly error of the parts, or the deviation of a condensing position occurring from aberrations and it may happen that the pitch interval deviates. In order to adjust this, the present embodiment adopts the technique of rotating the multibeam light source unit 9 holding the multibeam light source 9a about the optical axis and finely adjusting it, but the irregularity of the amount of rotation adjustment is nearly ±3° and therefore, in an assembly line, if the condensing lens 17 is absent, there will be produced a scanning optical apparatus which cannot effect synchronization detection and thus, an improvement in yield will be hampered.

In a construction as shown in FIGS. 3 and 4 wherein the condensing lens 17 is held integrally with the laser holder 9b, there is shown an optical path to the synchronization detector 18 when the multibeam light source unit 9 is rotation-adjusted. When as shown in FIG. 3, the multibeam light source unit 9 is not rotation-adjusted, the laser beams passed through the synchronization detection regulating portion 16a pass through the optical axis of the condensing lens 17 and are detected by the synchronization detector 18.

FIG. 4 shows the state after the multibeam light source unit 9 has been rotation-adjusted, and shows a case where the laser beams passed through the synchronization detection regulating portion 16a are incident on the outside (the lower side as viewed in FIG. 4) of the optical axis of the condensing lens 17. At this time, the relative positional relationship between the condensing lens 17 and the synchronization detector 18 is the same as that before rotation adjustment is effected, and the condensing lens 17 has only been moved parallel to a direction perpendicular to the optical axis relative to the laser beams incident on the condensing lens 17 and therefore, the laser beams are condensed on the synchronization detector 18 by the condensing function of the condensing lens 17. Accordingly, the synchronization detector 18 and the condensing lens 17 are rotated as a unit and therefore, even after the rotation adjustment of the multibeam light source unit 9, the laser beams can be detected by the synchronization detector 18.

The synchronization detection regulating portion 16a is formed integrally with the optical box 16, and is disposed at a location whereat the laser beams are condensed by the synchronization detecting optical system 15. By the synchronization detection regulating portion 16a being disposed at the condensing point for the laser beams, the signal detection timing by the synchronization detector 18 can be detected accurately.

Also, it has already been described that it is preferable that the area of the light receiving surface of the synchronization detector 18 of which a high-speed respondent property is required be as small as possible, and in this case, to reliably detect the laser beams by the light receiving surface, the relative positional relationship between the synchronization detector 18 and the condensing lens 17 is important and they need be positioned accurately. FIG. 5 shows the main scanning cross section of the synchronization detector 18. The synchronization detector 18 has the photoelectric converting portion (light receiving surface) 18a for detecting the laser beams and the resin portion (package portion) 18b protecting the photoelectric converting portion 18a and formed positionally accurately from the photoelectric converting portion 18a.

Heretofore, in some cases, the positioning of the synchronization detector 18 relative to the laser holder 9b has been effected with the soldered circuit substrate 9d engaged with the laser holder 9b, but the foot (terminal) of the synchronization detector 18 and the soldered portion of the circuit substrate 9b have been subjected to engagement having much rattle from the viewpoint of working property, and the synchronization detector 18 has not been soldered to the circuit substrate 9d in a state of very good positional accuracy. Therefore, in a method of effecting positioning with the circuit substrate 9d engaged with the laser holder 9b, the synchronization detector 18 could not be ensured to be accurately positioned relative to the laser holder 9b.

So, in the present embodiment, design is made such that the tapered portion of the package portion 18b formed positionally accurately from the light receiving surface 18a is directly brought into engagement with the laser holder 9b, whereby the light receiving surface 18a is accurately positioned relative to the laser holder 9b. The circuit substrate 9d is fastened and held as by screws, not shown, with the synchronization detector 18 and the laser holder 9b engaged with each other. It is preferable in dies cutting that the tapered portion of the synchronization detector 18 be present, but if the tapered portion is absent, a tapered portion may be formed on the laser holder 9b side to thereby give it the guide function during the positioning of the synchronization detector 18.

FIG. 6 shows a method of holding the condensing lens 17, and particularly shows means for holding it on the laser holder 9b by snap fit. The laser holder 9b is formed with snap fit portions 9e and 9f elastically deformable in the direction of the optical axis, and the condensing lens 17 is assembled from the direction of arrow so as to be biased toward the laser holder 9b by the snap fit portions 9e and 9f. The position of the condensing lens 17 in a place perpendicular to the optical axis need be accurately determined so that the laser beams may be detected by the light receiving surface 18a of the synchronization detector 18. Therefore, on the opposite lateral sides of the condensing lens 17, positioning ribs 9g and 9h are protruded from the laser holder 9b so that the condensing lens 17 may be inserted therebetween with a touch of fit.

The positioning of the condensing lens 17 in the assembly direction is effected by semispherical projected portions 17a, 17b, 17c and 17d being protruded from the condensing lens 17, and hook portions 9i and 9j being protruded from the laser holder 9b to thereby bring the projected portions 17a and 17c into engagement with the hook portions 9i and 9j, respectively. The snap fit portions 9e and 9f bias the portions among the projected portions 17a, 17b, 17c and 17d from the opposite side to thereby regulate the position of the condensing lens 17 in the direction of the optical axis and the rotation thereof about an axis perpendicular to the optical axis.

Also, the method of holding the condensing lens 17 on the laser holder 9b is not restricted to snap fit, but may be effected by a positioning member being protruded from the laser holder 9b or the condensing lens 17 to thereby effecting the positioning of the condensing lens 17 relative to the laser holder 9b, and the fixing thereof may be effected by a discrete resilient member. Further, while the snap fit portions 9e and 9f of the laser holder 9b assume a form elastically deformable in the direction of the optical axis, they may assume a form elastically deformable in a direction perpendicular to the optical axis, and in that case, the condensing lens 17 is designed to be biased by one of the positioning ribs 9g and 9h.

As regards the posture of the condensing lens 17 relative to the laser beams passing through this lens, if the condensing lens 17 is just opposite to the laser beams, there may occur the return of the light to the multibeam light source and therefore, it is preferable that the condensing lens 17 be disposed in inclined relationship with the laser beams.

Figure 7:
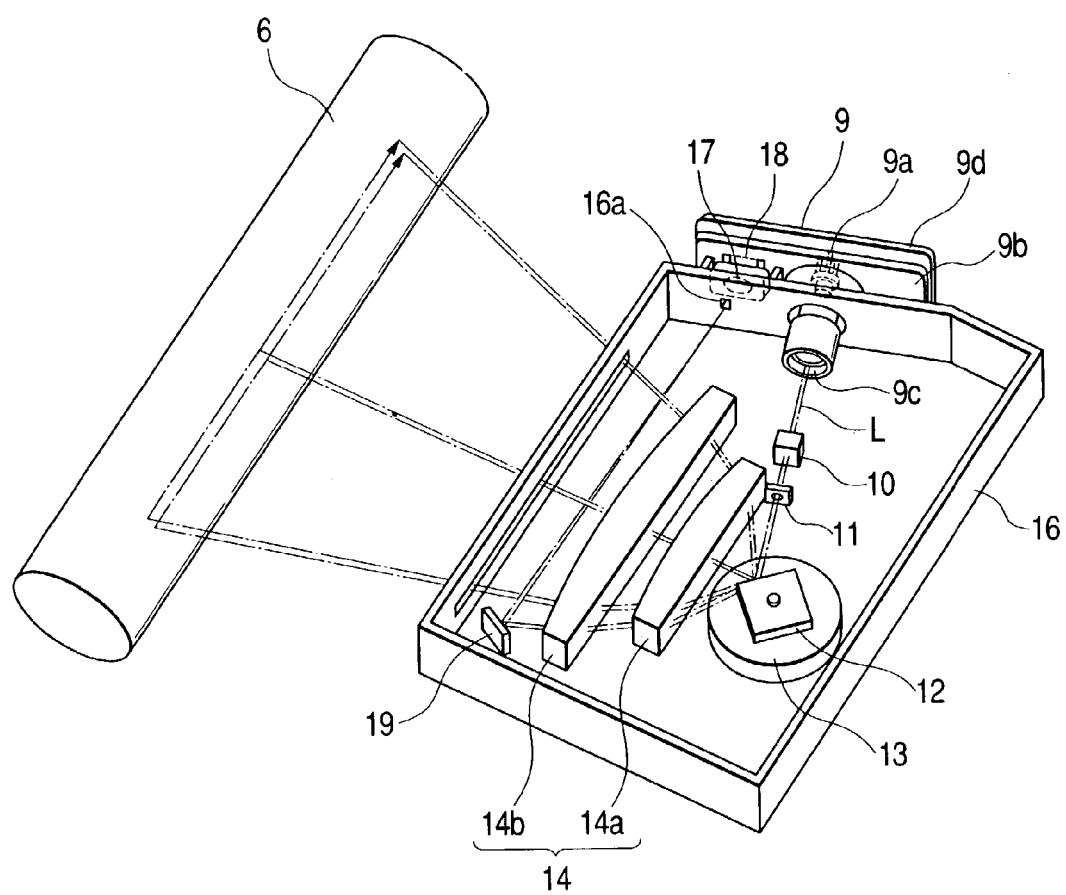
FIG. 7 shows another example of the scanning optical apparatus according to Embodiment 1 of the present invention.

While in the present embodiment, the synchronization detector 18 is disposed at a position whereat the laser beams detected by the synchronization detector 18 do not pass through the Fθ lens 14, there may be adopted a construction in which the laser beams passed through the Fθ lens 14 are detected by the synchronization detector 18. FIG. 7 is a perspective view of a scanning optical apparatus showing that construction. In this figure, the reference numeral 19 designates a synchronization detecting mirror, and in the other points, the construction of this scanning optical apparatus is similar to that of the present embodiment, and like reference characters designate like members. The synchronization detection regulating portion 16a is disposed at the condensing point of the Fθ lens 14, whereby the amount of relative deviation of the writing start position of each laser beam can be suppressed as mush as possible.

For example, in a construction wherein the laser beams are not passed through the Fθ lens 14 and the synchronization detection regulating portion 16a is disposed at the condensing point of the synchronization detecting optical system 15, the relative deviation of the writing start position of each laser beam on an image is proportional to the ratio between the focal length of the Fθ lens 14 and the focal length of the synchronization detecting optical system 15. When for example, the above-mentioned ratio is 3:1, the amount of relative deviation of the detection timing of each laser beam occurring in the synchronization detector 18 becomes a three-fold amount of writing start position deviation on the image. In a construction wherein the synchronization detection regulating portion 16a is disposed at the condensing point of the Fθ lens 14, however, the amount of relative deviation of the detecting timing of each laser beam occurring in the synchronization detection regulating portion 16a and the amount of relative deviation of the writing start position on the image become equal to each other and therefore, the amount of relative deviation of the writing start position can be suppressed as much as possible.

As described above, the configuration of the package portion 18b of the synchronization detector 18 is directly brought into engagement with the laser holder 9b to thereby position the synchronization detector 18 on the laser holder 9b, and the positioning ribs 9g, 9h and the snap fit portions 9e, 9f for positioning the condensing lens 17 on the laser holder 9b are provided on the side opposite thereto, whereby it becomes possible to accurately position the synchronization detector 18 and the condensing lens 17 relative to the laser holder 9b, and in addition, it becomes possible to accurately determine the relative position of the synchronization detector 18 and the condensing lens 17. Accordingly, even after the rotation adjustment of the multibeam light source unit 9, the laser beams can be reliably introduced to the light receiving surface 18a of the synchronization detector 18.

(Embodiment 2)

Figure 8:
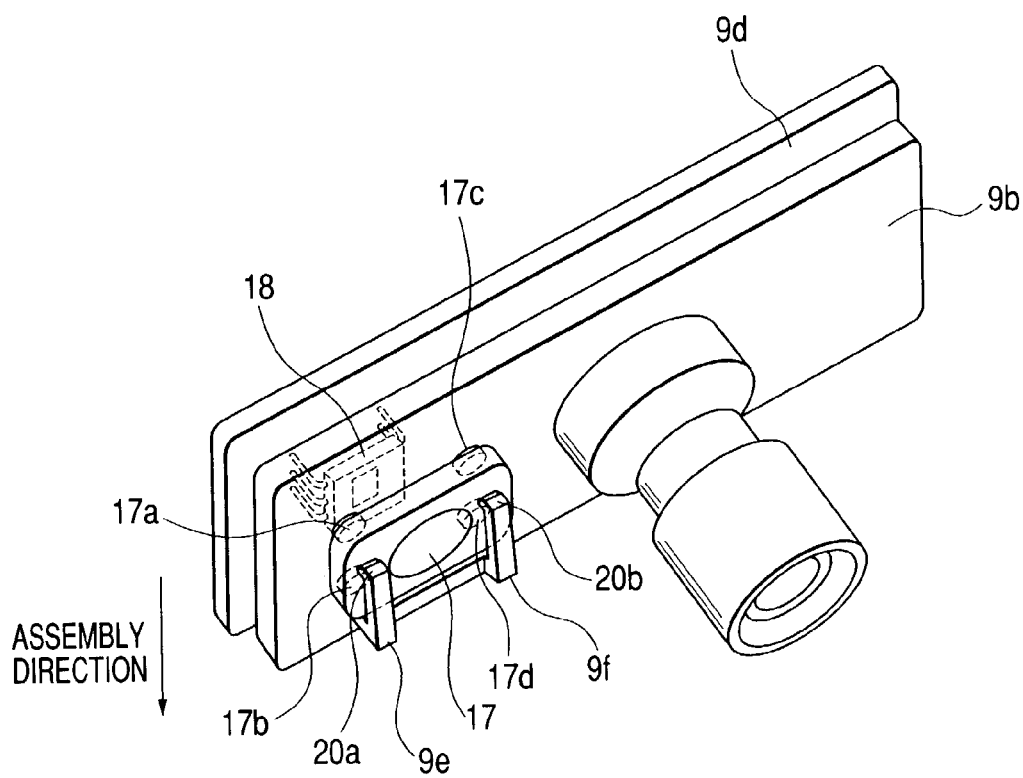
FIG. 8 is a perspective view of a multibeam light source unit according to Embodiment 2 of the present invention.

FIG. 8 is a perspective view of a multibeam light source unit according to Embodiment 2 of the present invention.

In this figure, the reference characters 20a and 20b designate adhesive agents for fixing the condensing lens 17 to the laser holder 9b, and in the other points, the construction of this embodiment is similar to that of Embodiment 1, and like reference characters designate like members and they need not be described.

In the above-described construction, the condensing lens 17, as in Embodiment 1, is biased toward the laser holder 9b by the snap fit portions 9e and 9f protruded from the laser holder 9b. When in the multibeam light source, it is necessary to detect each laser beam by the synchronization detector 18, a high-speed respondent property is required of the synchronization detector 18.

Therefore, it is preferable that the size of the light receiving portion of a signal detecting sensor be as small as possible. If the size of the light receiving portion of the sensor becomes small, it is necessary that the positioning of the condensing lens 17 for condensing the laser beams on the light receiving portion of the synchronization detector relative to the synchronization detector 18 be effected highly accurately, and if the condensing lens 17 is simply assembled to the laser holder 9b, it will become difficult to provide positional accuracy.

So, by adopting a construction in which the condensing lens 17 is biased toward the laser holder 9b by the snap fit portions 9e and 9f, and is thereafter movable in a direction perpendicular to the direction of the optical axis, the positional adjustment of the condensing lens 17 is effected to such a position that all of the laser beams passed through the condensing lens 17 enter the light receiving surface of the synchronization detector 18, and at that position, the condensing lens 17 and the laser holder 9b are fixed by the use of the adhesive agents 20a and 20b. The adhesive agents 20a and 20b may preferably be ultraviolet ray hardening adhesive agents hardened within a short time.

As described above, the positional adjustment of the condensing lens 17 is effected when the light receiving portion of the synchronization detector 18 is small and the positioning of the condensing lens 17 relative to the laser holder 9b is difficult, where after the optical element 17 and the laser holder 9b are fixed to each other by the adhesive agent, whereby there is provided a construction similar to that of Embodiment 1, and similar action can be obtained.

(Embodiment 3)

Figure 9A:
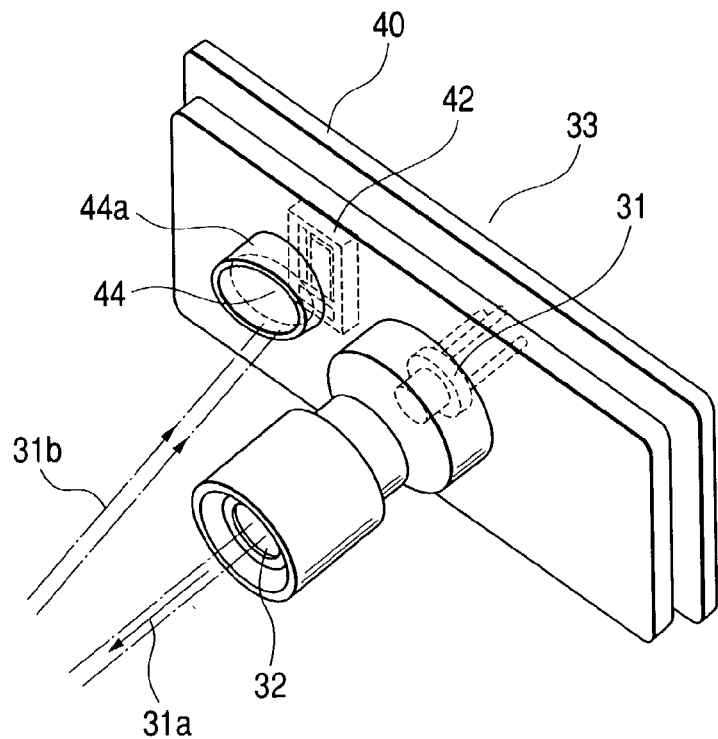
FIG. 9A is a perspective view and FIGS. 9B and 9C are side views of a multibeam light source unit according to Embodiment 3 of the present invention.
Figure 9B:
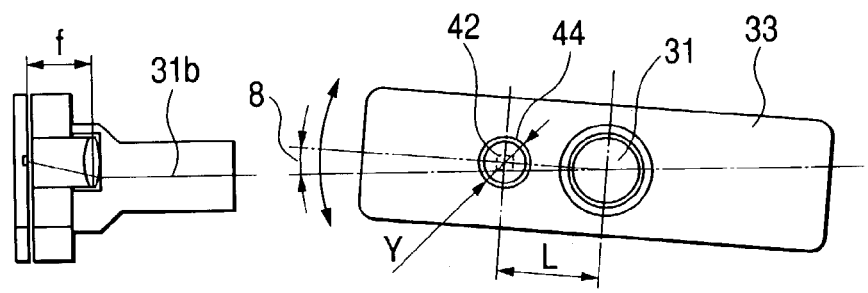
Figure 9C:
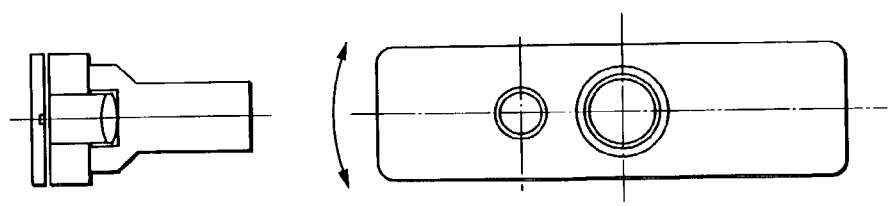

FIG. 9A is a perspective view and FIGS. 9B and 9C are side views of a multibeam light source unit according to Embodiment 3 of the present invention.

In these figures, a condensing lens 44 is formed integrally with a laser holder 33 on this side of the incidence side of a BD sensor 42 which is a light receiving element so that a deflected and reflected beam 31b can be introduced thereto. A lens barrel 44a for containing the condensing lens 44 therein may be resin-molded integrally with the laser holder 33 or may have a discrete member assembled thereto.

In such a construction, even if as shown in FIGS. 9B and 9C, the laser holder 33 is rotated about an optical axis 31a and the BD sensor 42 is rotatively moved in the same direction and deviates from scanning light 31b, the scanning light 31b from a light deflector is incident on the condensing lens 44 provided on the incidence side of the BD sensor 42 and therefore, the scanning light 31b can be reliably condensed on and introduced into the BD sensor 42 as an optical signal.

Also, it is desirable that the condensing lens 44 having a focal length f be disposed at a position of a distance f on this side from the incidence surface of the BD sensor 42. This is because the light 31b passed through the condensing lens 44 is focused at the position of the focal length of the condensing lens 44 and therefore if the BD sensor 42 is disposed at this position, the waveform of an optical signal can be more accurately inputted to the BD sensor 42 and thus, more highly accurate signal detection can be effected. Also, it is desirable that the relation between the diameter Y of the condensing lens in the sub-scanning direction and the diameter R of the beam from the laser beam emitting portion in the sub-scanning direction satisfy the following expression:

$$R \leq Y \leq 3R,$$

Where Y: the diameter of the second condensing lens in the sub-scanning direction, X: the diameter of the beam from the laser beam emitting portion in the sub-scanning direction.

The reason why the diameter Y of the condensing lens in the sub-scanning direction is made equal to or greater than the beam diameter R of the emitted light 31a from the laser emitting portion 31 is that it is a necessary minimum diameter as a diameter by which even when a beam made infinitely approximate to a parallel beam by a discrete B1) condensing lens (not shown) is incident on the condensing lens 44, the condensing lens can reliably introduce the light thereinto and can direct it into the B1) sensor 112. Also, the reason why the upper limit of the diameter Y is equal to or less than threefold of the beam diameter R of the emitted light 31a from the laser beam emitting portion 31 is that even when a beam infinitely approximate to a parallel beam is incident on the condensing lens 44 from the discrete BD condensing lens (not shown), a rotation adjustment allowance corresponding to the diameter of the emitted beam is obtained and therefore adjusting work can be done easily. At this time, the diameter Y of the condensing lens in the sub-scanning direction taking the rotation adjustment allowance also into account is expressed by the following expression:

$$Y = 2L \times \tan\theta + R \leq 3R,$$

where

L: the distance from the center of the plurality of light emitting points to the center of the BD sensor, θ: laser unit rotation adjustment angle, R: the diameter of the beam from the laser beam emitting portion in the sub-scanning direction.

Here, specifically describing the present embodiment, L=50 mm, R=2 mm and θ=2° and therefore $$Y = 2L \times \tan\theta + R = 5.5 \text{ mm}.$$

This is equal to or less than threefold of the diameter R of the beam from the laser beam emitting portion in the sub-scanning direction, and can sufficiently satisfy the present construction when it is considered that the ordinary laser unit rotation adjustment angle is within ±2°. By thus setting, even if the beam from the BD condensing lens (not shown) is a parallel beam or a convergent beam, the scanning light 31b from the light deflector can be made to enter the condensing lens 44 without fail and therefore, the scanning light 31b can be reliably introduced into the BD sensor 42 as an optical signal.

(Embodiment 4)

Figure 10A:
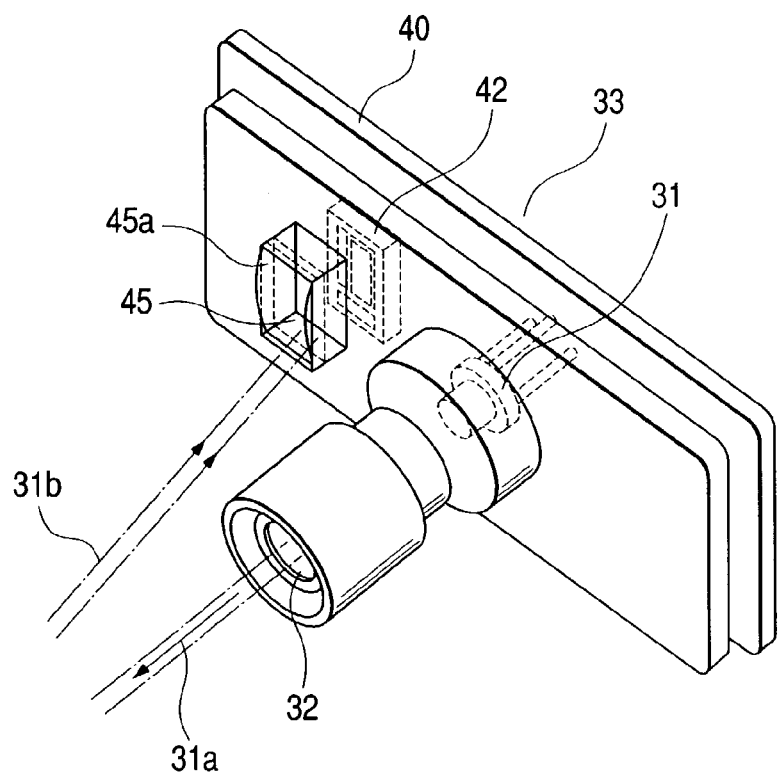
FIGS. 10A and 10B are perspective views of a multibeam light source unit according to Embodiment 4 of the present invention.
Figure 10B:
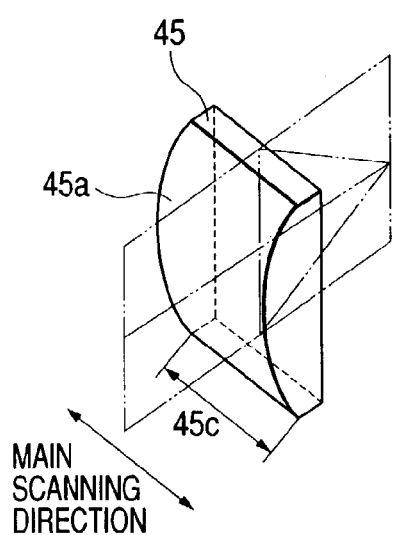

FIGS. 10A and 10B are perspective views of a multibeam light source unit according to Embodiment 4 of the present invention.

Embodiment 4 is characterized in that the condensing lens integral with the laser holder in Embodiment 3 is formed by a cylindrical lens.

Accordingly, in the other points, the construction of Embodiment 4 is common to that of Embodiment 3 and therefore, in FIG. 10A, common portions are given the same reference characters and need not be described in detail. In the present construction, the condensing lens is formed by a cylindrical lens 45. The cylindrical lens 45 has a cylindrical refracting surface 45a and therefore, as shown in FIG. 10B, it condenses light in the direction of curvature of the lens and does not act in the direction of the length 45c thereof, and is therefore very effective in a case where an opening portion like a slit is provided on the incidence side of the BD sensor 42. Particularly in a multilaser beam from the semiconductor laser 41 provided with a plurality of light emitting points, the writing start timing in the main scanning direction becomes important and therefore, it is desired to avoid scanning light 41b from being refracted in the main scanning direction, as far as possible.

With such a construction, even if the laser holder 43 is rotated about the optical axis and the BD sensor 42 is rotatively moved in the same direction and deviates from the deflected and reflected beam 31b, the deflected and reflected bean 31b from the light deflector enters the effective diameter of the condensing lens 44 and of course, the scanning light can be reliably introduced into the BD sensor 42 as an optical signal and the error factor of the writing start timing in the main scanning direction by the multilaser beam from the plurality of light emitting points can be made small to the utmost and therefore, there can be provided a deflecting and scanning apparatus which is very simple to adjust and high in reliability.

While the embodiments of the present invention have been described above, the present invention is in no way restricted to the above-described embodiments, but all modifications are possible within the technical idea of the present invention.

What is claimed is:

1. A scanning optical apparatus comprising:
    a multibeam light source having a plurality of light emitting points;
    a holding member for holding said multibeam light source;
    deflecting means for deflecting light emitted from said multibeam light source;
    an optical box for containing said deflecting means;
    detecting means for detecting the light deflected by said deflecting means; and
    condensing means for condensing the light incident on said detecting means;
    wherein said holding member positions said detecting means, and holds said condensing means, and
    wherein said holding member is attached to said optical box so as to be rotatable about an optical axis of the light emitted from said multibeam light source.

2. A scanning optical apparatus according to claim 1, wherein said holding member has a positioning portion for positioning each of said detecting means and said condensing means.

3. A scanning optical apparatus according to claim 2, wherein said detecting means has a light receiving portion for detecting the light, and a package portion for containing said light receiving portion therein and transmitting the light therethrough, and a portion of said package portion abuts against said holding member, whereby said detecting means is positioned by said holding member.

4. A scanning optical apparatus according to claim 2, wherein said condensing means is movable in a direction perpendicular to the axial direction of the light incident on said detecting means.

5. A scanning optical apparatus according to claim 1, wherein the light incidence side surface of said condensing means is inclined with respect to incident light.

6. A scanning optical apparatus according to claim 1, wherein the relation between the diameter Y of said condensing means in a sub-scanning direction and the beam diameter R of the light emitted from said multibeam light source in the sub-scanning direction satisfies the following expression:

$$R \leq Y \leq 3R.$$

* * * * *

UNITED STATES PATENT AND TRADEMARK OFFICE
CERTIFICATE OF CORRECTION

PATENT NO. : 6,969,846 B2
DATED : November 29, 2005
INVENTOR(S) : Yoshihiko Tanaka et al.

It is certified that error appears in the above-identified patent and that said Letters Patent is hereby corrected as shown below:

Column 7,
Line 33, "mush" should read -- much --.

Column 9,
Lines 28 and 31, "B1)" should read -- BD --; and
Line 55, "Y=2L x tanθ + R = 5.5 mm." should read -- Y=2L x tanθ + R $\simeq$ 5.5 mm. --.

Column 10,
Line 28, "bean 31b" should read -- beam 31b --.

Signed and Sealed this

Sixth Day of June, 2006

JON W. DUDAS
*Director of the United States Patent and Trademark Office*